(12) United States Patent
Chen et al.

(10) Patent No.: US 7,265,986 B2
(45) Date of Patent: Sep. 4, 2007

(54) COMPUTER ENCLOSURE WITH TOP COVER CONVENIENTLY ASSEMBLED ON CHASSIS THEREOF

(75) Inventors: Yun-Lung Chen, Tu-Cheng (TW); Yi-Chung Hsiao, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 13 days.

(21) Appl. No.: 11/292,254

(22) Filed: Dec. 1, 2005

(65) Prior Publication Data

US 2006/0262508 A1    Nov. 23, 2006

(30) Foreign Application Priority Data

May 18, 2005    (CN)    .................. 2005 2 0058646 U

(51) Int. Cl.
*H05K 7/16* (2006.01)
(52) U.S. Cl. .................................................. 361/726
(58) Field of Classification Search ................ 361/724, 361/683, 725, 726, 727; 439/53, 153, 157; 16/404; 312/223.1, 223.2
See application file for complete search history.

(56) References Cited

U.S. PATENT DOCUMENTS

| | | | | |
|---|---|---|---|---|
| 5,197,789 A | | 3/1993 | Lin | 312/223.2 |
| 6,157,532 A | * | 12/2000 | Cook et al. | 361/681 |
| 6,583,983 B1 | | 6/2003 | Chen et al. | 361/683 |
| 6,721,183 B1 | * | 4/2004 | Chen et al. | 361/726 |
| 7,072,177 B2 | * | 7/2006 | Peng et al. | 361/685 |
| 7,082,036 B2 | * | 7/2006 | Cheng et al. | 361/726 |
| 7,110,251 B2 | * | 9/2006 | Wu | 361/685 |
| 7,142,431 B2 | * | 11/2006 | Li et al. | 361/726 |
| 2002/0167790 A1 | * | 11/2002 | Gan | 361/683 |
| 2005/0007734 A1 | * | 1/2005 | Peng et al. | 361/685 |
| 2006/0034046 A1 | * | 2/2006 | Chen et al. | 361/683 |

* cited by examiner

*Primary Examiner*—Chandrika Prasad
(74) *Attorney, Agent, or Firm*—Morris Manning & Martin LLP; Tim Tingkang Xia, Esq.

(57) ABSTRACT

A computer enclosure includes a chassis (60), an operating member (30), a resilient member (80), and a top cover (10). The chassis has a catch flange (52) which defines a plurality of locking openings (524) therein. The operating member is slidably attached to the chassis. The resilient member is connected between the chassis and the operating member, and deforms when the operating member slides relative to the chassis. The top cover has a plurality of hooks (12) formed thereon. When the resilient member returns to a relaxed condition, the hooks insert into the locking openings and are pushed by the operating member, and the catch flange is sandwiched between free ends of the hooks and the top cover.

20 Claims, 6 Drawing Sheets

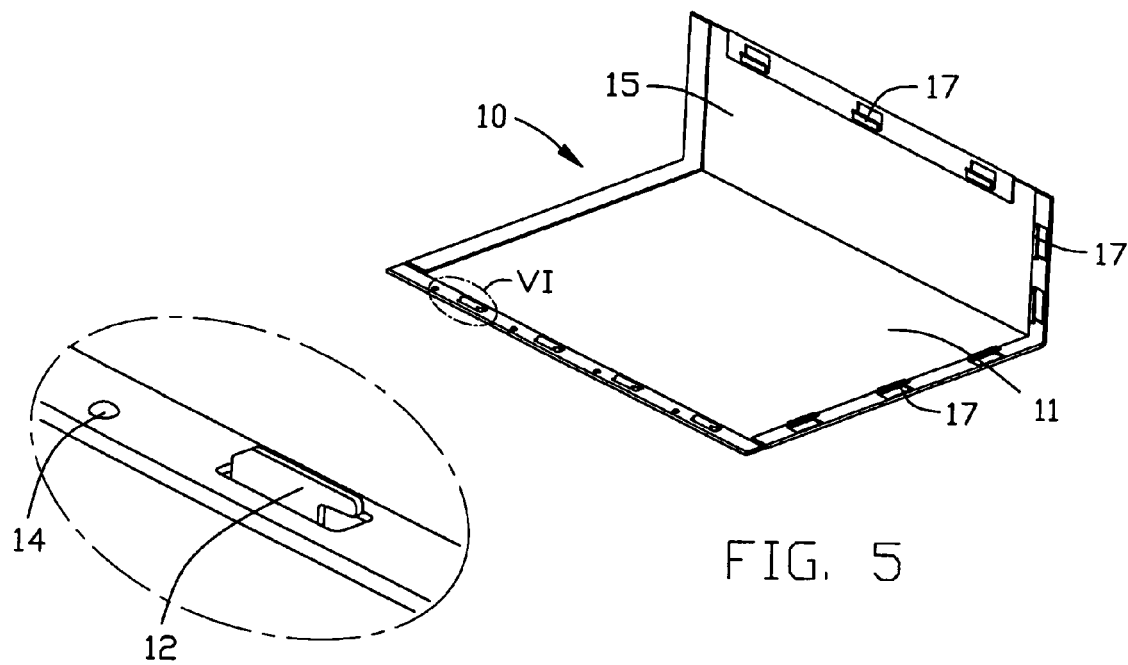
FIG. 5
FIG. 6
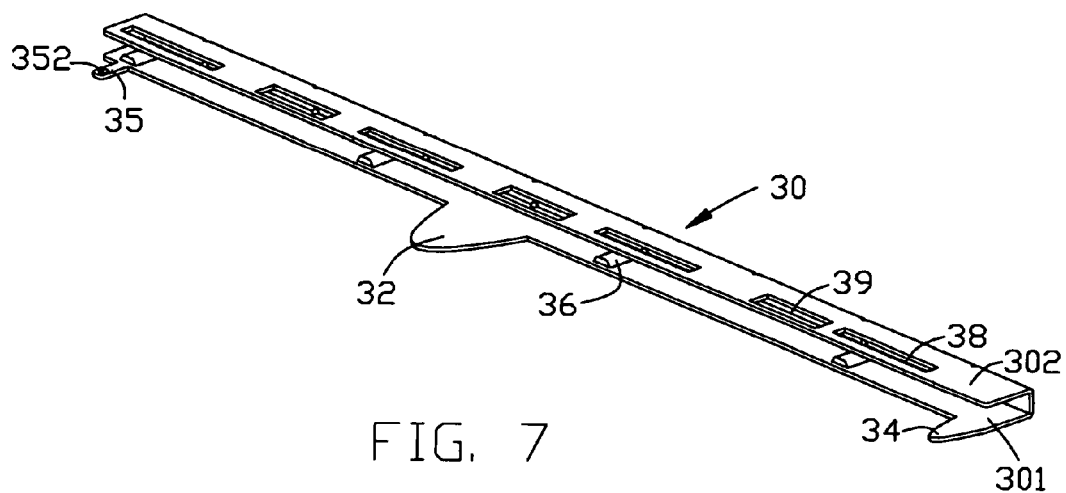
FIG. 7

COMPUTER ENCLOSURE WITH TOP COVER CONVENIENTLY ASSEMBLED ON CHASSIS THEREOF

BACKGROUND OF THE INVENTION

1. Field of the Invention

The present invention relates to computer enclosures, and more particularly to a computer enclosure with a top cover that can be easily removed and reattached as necessary.

2. General Background

Generally, a computer enclosure includes a cover. The cover is often removed from the computer enclosure when electronic elements in the computer enclosure need to be replaced or maintained.

A typical computer enclosure connecting structure includes a base, a cover and a surface panel, each with corresponding structures allowing for assembly together with bolts. The surface panel is designed with a plurality of seats for holding sockets and switches, which are fixed by structures of the surface panel itself without the use of any fasteners. The base includes stepped edges to position its front and back plate firmly, and eliminate the possibility of deformation caused by external force. However, it is inconvenient to secure the cover to the base.

Another kind of computer enclosure includes a cage, a side panel, a top panel, and a fastening device for securing the side panel to the top panel. The side panel has a plurality of hooks. The top panel defines a sliding slot for slidably accommodating the fastening device. A plurality of recesses defined in one side of the top panel corresponds with through-holes defined in one slot wall bordering the sliding slot. A plurality of through openings is defined through the fastening device. A spring is placed over a cross-shaped nub on one end of the fastening device. When the hooks are extending into the through openings, the hooks urge the fastening device to compress the spring. The spring then relaxes, thereby enabling the hooks to engage the side panel with the top panel. However, it is inconvenient to install the fastening device to the cage.

What is needed, therefore, is a computer enclosure having an operating member for conveniently securing a cover to the computer enclosure and thereby being able to easily and repeatedly remove and replace the cover.

SUMMARY

A computer enclosure includes a chassis, an operating member, a resilient member, and a top cover. The chassis has a catch flange which defines a plurality of locking openings therein. The operating member is slidably attached to the chassis. The resilient member is connected between the chassis and the operating member, and deforms when the operating member slides relative to the chassis. The top cover has a plurality of hooks formed thereon. When the resilient member returns to a relaxed condition, the hooks insert into the locking openings and are pushed by the operating member, and the catch flange is sandwiched between free ends of the hooks and the top cover.

Other advantages and novel features will be drawn from the following detailed description of a preferred embodiment with attached drawings, in which:

BRIEF DESCRIPTION OF THE DRAWINGS

FIG. 5 is an isometric view of the top cover of FIG. 1;

FIG. 6 is an enlarged view of a circled portion VI of FIG. 5;

FIG. 7 is an enlarged, isometric view of the operating member of FIG. 1;

DETAIL DESCRIPTION OF PREFERRED EMBODIMENT

Figure 1:
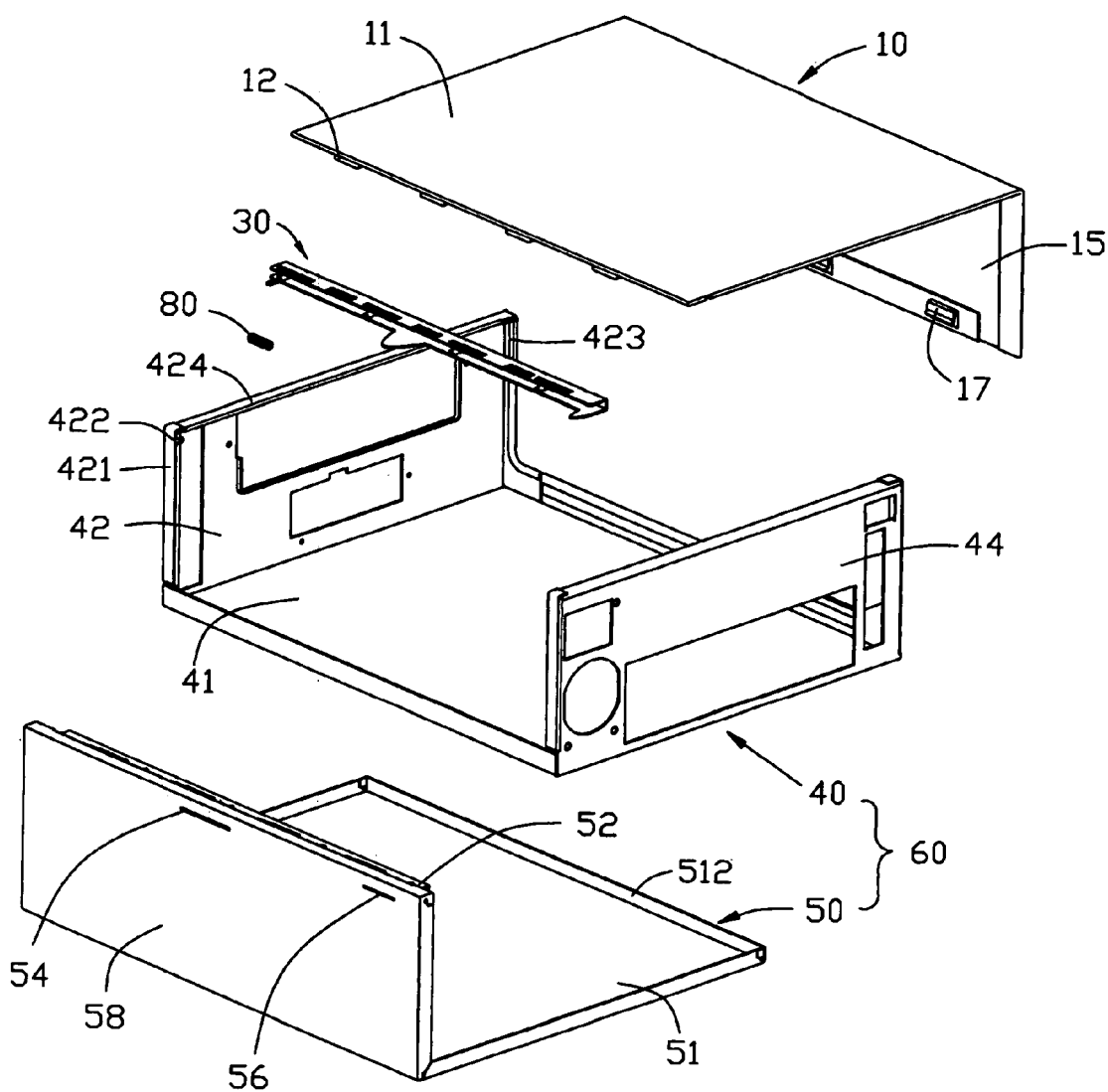
FIG. 1 is an exploded, isometric view of a computer enclosure of a preferred embodiment of the present invention, the computer enclosure including a chassis which has a base, a bottom cover, a top cover, and an operating member.

Referring to FIG. 1, an enclosure of an electronic device like a computer includes a chassis 60, a top cover 10, and an operating member 30 for releasably attaching the top cover 10 to the chassis 60.

Figure 2:
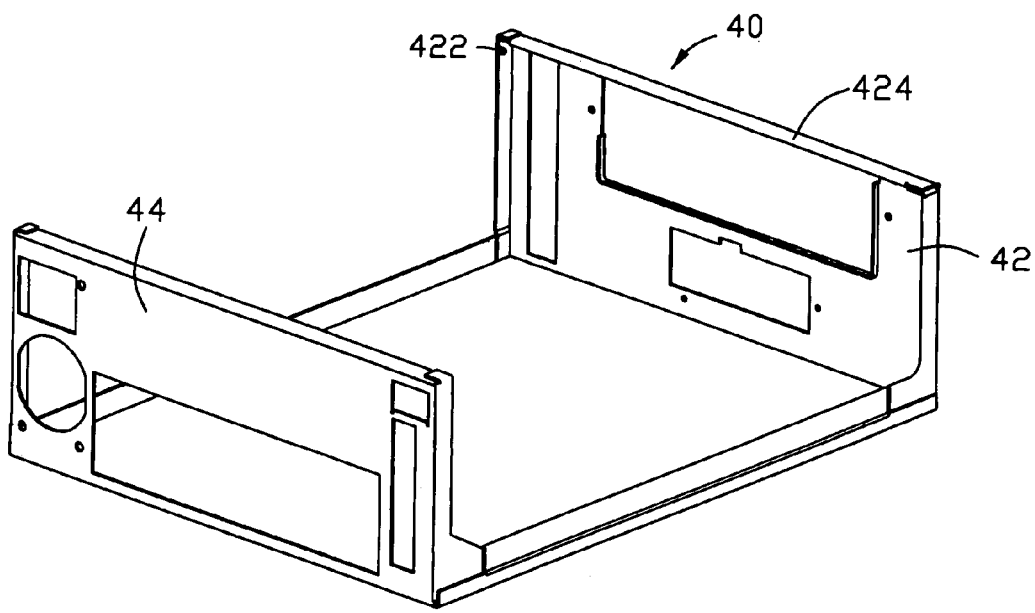
FIG. 2 is an isometric view of the base of FIG. 1.
Figure 4:
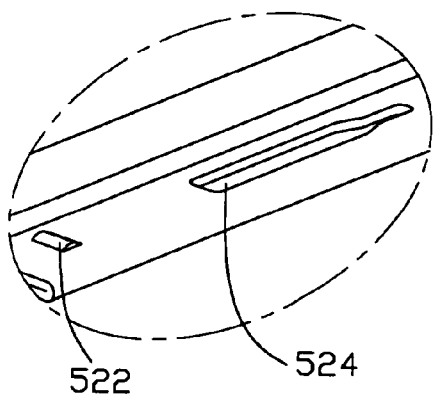
FIG. 4 is an enlarged view of a circled portion IV of FIG. 3.
Figure 3:
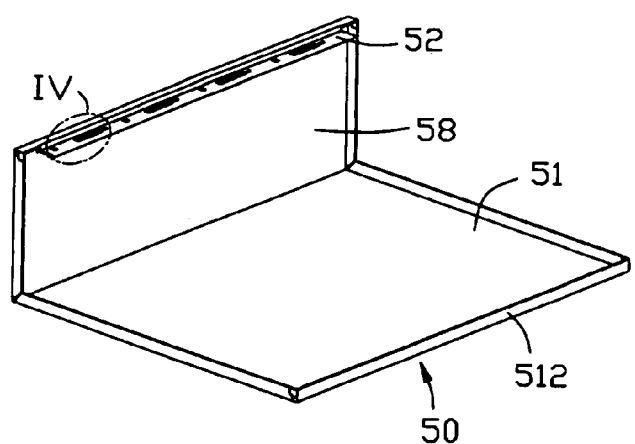
FIG. 3 is an isometric view of the bottom cover of FIG. 1.

Referring also to FIGS. 2 to 4, the chassis 60 includes a base 40, and a bottom cover 50 fixed to the base 40. The base 40 has a bottom plate 41 and a pair of side plates 42, 44. The side plates 42, 44 are perpendicularly bent from opposite edges of the bottom plate 41. The side plate 42 has a front flange 421, a rear flange 423, and a top flange 424. A mounting tab 422 with a retaining hole defined is inwardly bent from the front flange 421 of the side plate 42. The bottom cover 50 includes a bottom wall 51, and a side wall 58 perpendicular to the bottom wall 51. The bottom wall 51 has a plurality of positioning flanges 512 at edges thereof. A catch flange 52 extends from the side wall 58. A plurality of spaced locking openings 524 is defined in the catch flange 52. An arc-shaped stop block 522 is disposed at one side of each locking opening 524. A sliding slot 54 and a guiding slot 56 are defined in the side wall 58 adjacent to the catch flange 52.

Referring also to FIGS. 5 and 6, the top cover 10 includes a top wall 11, and a side wall 15 perpendicular to the top wall 11. A plurality of hooks 12 protrudes from a front edge of the top wall 11, corresponding to the locking openings 524. A dome-shaped protrusion 14 is formed at one side of each hook 12. A plurality of locating clips 17 is disposed on the top wall 11 and the side wall 15.

Referring also to FIG. 7, the operating member 30 includes two support plates 301, 302. A plurality of securing openings 38 is defined in the support plate 302, for receiving the hooks 12 of the top cover 10. A through opening 39 is defined between every two securing openings 38, for the corresponding protrusion 14 to slide therein. A plurality of projecting blocks 36 is formed at the support plate 301 below the securing openings 38. A projecting tab 35 with a locking hole 352 defined therein extends from one end of the support plate 301, and a positioning portion 34 extends from the other end of the support plate 301. An operating portion 32 extends from a middle portion of the support plate 301.

Figure 8:
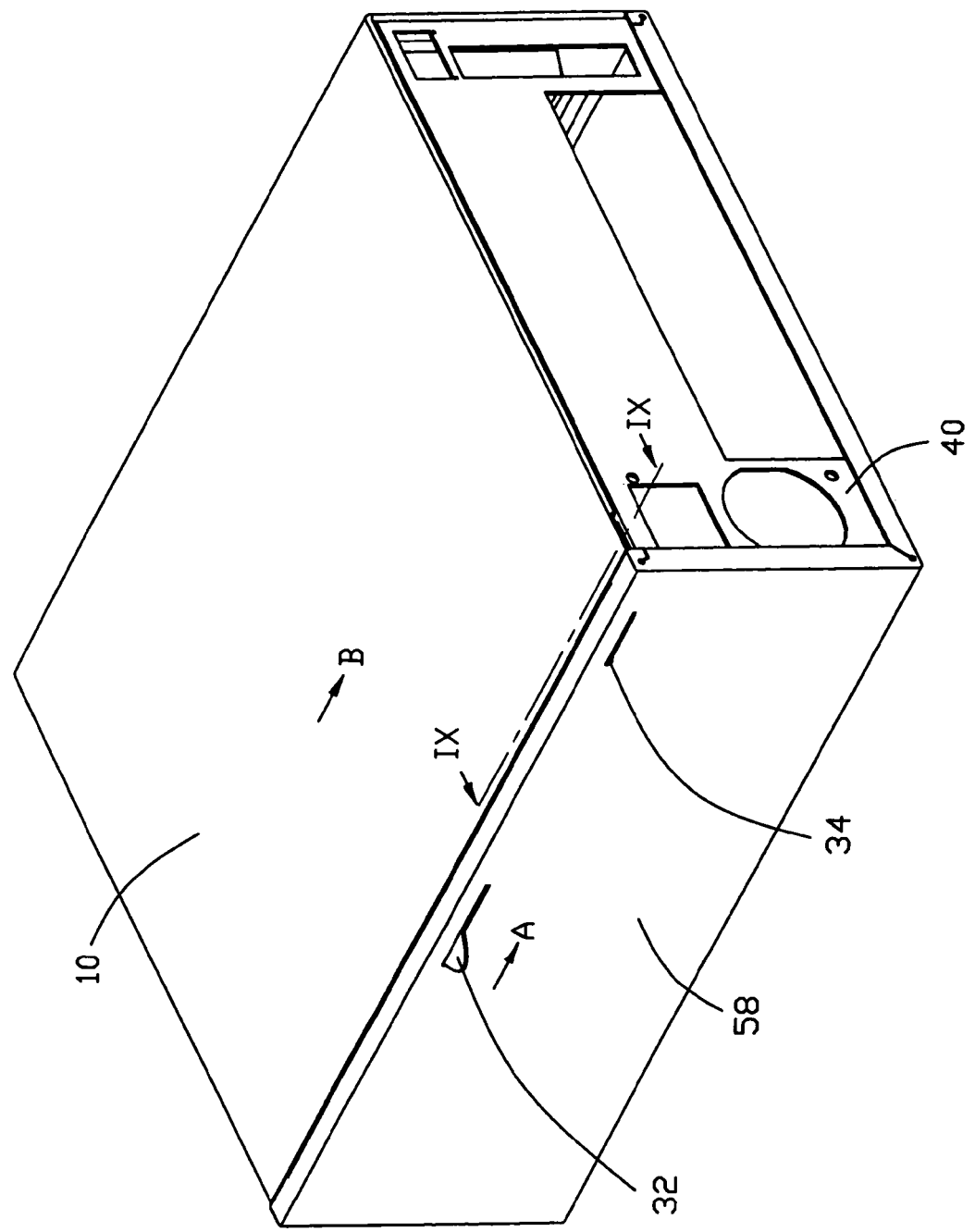
FIG. 8 is an assembled view of the computer enclosure of FIG. 1.
Figure 9:
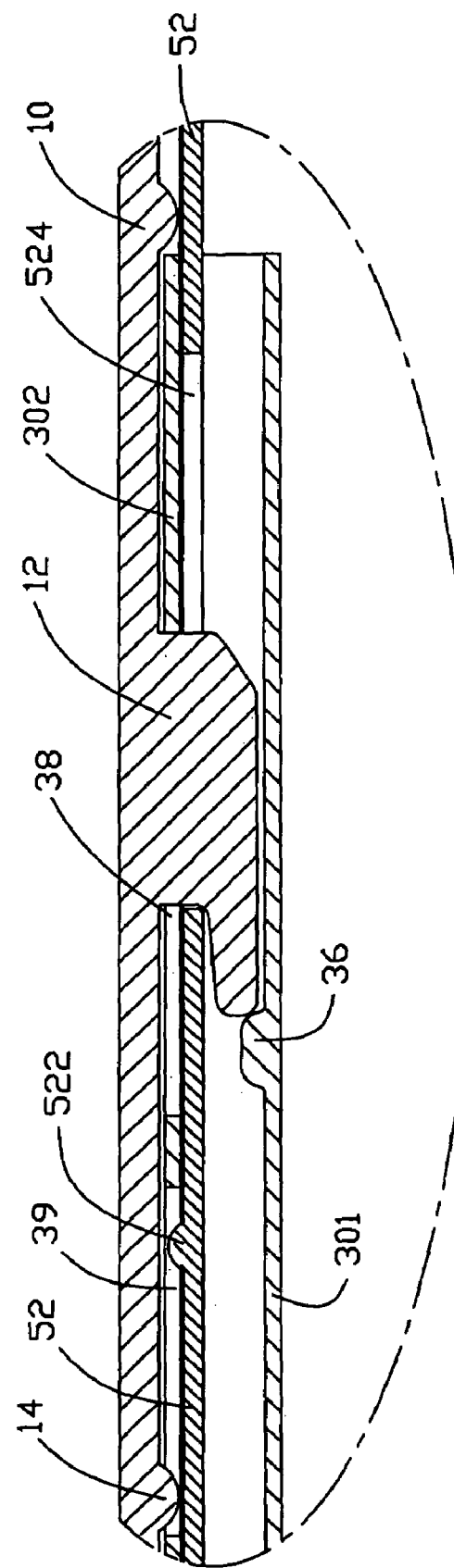
FIG. 9 is a cross-sectional view of part of the computer enclosure of FIG. 8 taken along line IX-IX thereof, showing the top cover in a locked position.

Referring also to FIGS. 8 and 9, in assembly, the bottom cover 50 is secured to the base 40. The side wall 58 abuts against the front flange 421 of the side plate 42. The operating member 30 is attached to the chassis 60. The catch flange 52 of the bottom cover 50 is located between the support plates 301, 302 of the operating member 30. The operating portion 32 and the positioning portion 34 are inserted through the sliding gap 54 and the guiding gap 56 respectively. The projecting tab 35 of the operating member 30 is adjacent to the mounting tab 422 of the base 40. A resilient member 80, such as a spring shown in FIG. 1, is hooked into the locking hole 352 of the projecting tab 35 and the retaining hole of the mounting tab 422, so that the operating member 30 can resiliently slide relative to the chassis 60. The positioning portion 34 is used to have the operating member 30 sliding smoothly. Preferably, a handle is further installed on the operating portion 32 to prevent from hurting, and firmly position the operating member 30 onto the chassis 60.

The top cover 10 is then placed on the chassis 60. The locating clips 17 of the side wall 15 of the top cover 10 engage with the positioning flange 512 of the bottom cover 50. The protrusions 14 of the top cover 10 are received in the through openings 39 of the operating member 30. The hooks 12 of the top cover 10 are supported by the support plate 302 of the operating member 30.

The operating portion 32 is urged along direction A, as shown in FIG. 8, thereby causing the operating member 30 to slide from a first position to a second position. The resilient member 80 is resiliently elongated. The securing openings 38 of the operating member 30 align with the locking openings 524 of the bottom cover 50. The hooks 12 of the top cover 10 are inserted into the locking openings 524 respectively through the securing openings 38. Then the operating portion 32 is released. The resilient member 80 returns to a relaxed condition, and drives the operating member 30 to slide from the second position to the first position, thereby taking the securing openings 38 out of alignment with the locking openings 524. The hooks 12 are guided by the edges of the securing openings 38, whereby the top cover 10 slides until the support plate 302 is sandwiched between the free ends of the hooks 12 and the top wall 11 of the top cover 10. The projecting blocks 36 are adjacent to the free ends of the hooks 12 respectively. The locking clips 17 of top wall 11 and the side wall 15 engage with the rear flange 423 and the top flange 424 of side plate 42 of the base 40 respectively. The top cover 30 is thus secured to the chassis 60.

Figure 10:
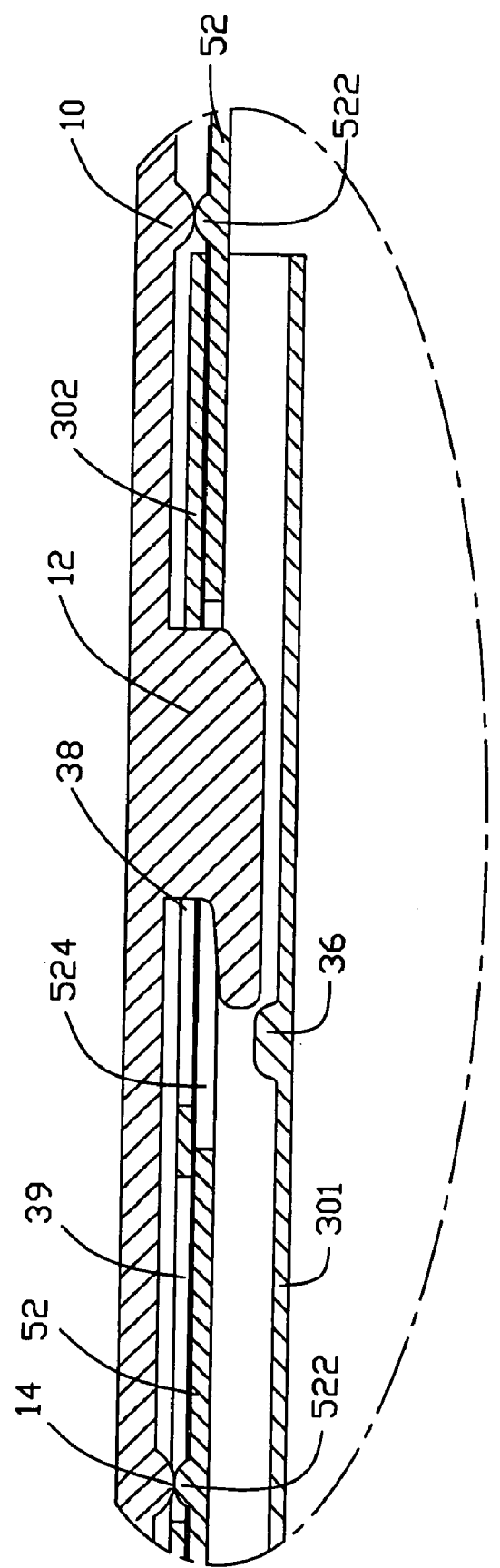
FIG. 10 is similar to FIG. 9, but showing the top cover in an unlocked position.

Referring also to FIG. 10, when removing the top cover 10 from the chassis 60, the operating member 30 is slid from the first position to the second position along direction A. The resilient member 80 is resiliently elongated. The projecting blocks 36 push the free ends of the hooks 12, thereby sliding the top cover 10 along direction B, as shown in FIG. 8. When the securing openings 38 align with the locking openings 524, the support plate 302 disengages from the hooks 12. The locating clips 17 of the top cover 10 disengage from the rear flange 423 and the top flange 424 of the base 40. The protrusions 14 of the top cover 10 are pressed against the stop blocks 522 of the catch flange 52 of the base 40, thereby lifting the top cover 10. Thus, the top cover 10 can be taken away from the chassis 60.

It is to be understood, however, that even though numerous characteristics and advantages have been set forth in the foregoing description of a preferred embodiment, together with details of the structure and function of the preferred embodiment, the disclosure is illustrative only, and changes may be made in detail, especially in matters of shape, size, and arrangement of parts within the principles of the invention to the full extent indicated by the broad general meaning of the terms in which the appended claims are expressed.

We claim:

1. A computer enclosure comprising:
    a chassis having a catch flange, which defines a plurality of locking openings therein;
    an operating member slidably attached to the chassis;
    a resilient member connected with the chassis and the operating member; and
    a top cover having a plurality of hooks formed thereon, wherein the hooks are inserted into the corresponding locking openings of the chassis to elongate the resilient member, and are pushed by the operating member to slide in the corresponding locking openings and thereby sandwich the catch flange between free ends of the hooks and the top cover when the resilient member returns to a relaxed condition.

2. The computer enclosure as described in claim 1, wherein a projecting tab is disposed on the operating member, and a mounting tab is disposed on the chassis, thereby attaching the resilient member between the projecting tab and the mounting tab.

3. The computer enclosure as described in claim 1, wherein a plurality of locating clips is formed on the top cover, for engaging with the chassis when the top cover slides into a locked position.

4. The computer enclosure as described in claim 1, wherein the chassis defines a sliding gap therein, and an operating portion extends from the operating member through the sliding gap for operation of the operating member.

5. The computer enclosure as described in claim 1, wherein the operating member defines a plurality of securing openings therein, for receiving the hooks of the top cover.

6. The computer enclosure as described in claim 5, wherein a plurality of projecting blocks is disposed on the operating member, for urging the hooks to disengage from edges of the locking openings.

7. The computer enclosure as described in claim 6, wherein a plurality of stop blocks is formed on the catch flange of the chassis, and a plurality of protrusions is formed on the top cover for engaging with the stop blocks and thereby lifting the top cover from the chassis.

8. The computer enclosure as described in claim 7, wherein the operating member comprises a pair of support plates, and the plurality of projecting blocks and the plurality of securing openings are disposed at the support plates respectively.

9. The computer enclosure as described in claim 8, wherein one of the support plates of the operating member defines a plurality of through openings adjacent to the securing openings respectively, for receipt of the protrusions therethrough to engage with the stop blocks of the chassis.

10. A computer enclosure comprising:
    a chassis having a catch flange, which defines a plurality of locking openings therein;
    an operating member slidably attached to the chassis, a plurality of securing openings defined therein;
    a resilient member connected with the chassis and the operating member, the resilient member deforming when the operating member slides relative to the chassis; and
    a top cover with a plurality of hooks formed thereon, the hooks inserting into the locking openings when the securing openings align with the locking openings, and free ends of the hooks hooking on the catch flange when the securing openings go out of alignment with the locking openings when the resilient member relaxes to a normal condition.

11. The computer enclosure as described in claim 10, wherein a projecting tab is disposed on the operating member, and a mounting tab is disposed on the chassis, thereby attaching the resilient member between the projecting tab and the mounting tab.

12. The computer enclosure as described in claim 10, wherein a plurality of locating clips is formed on the top cover for engaging with the chassis when the top cover slides into a locked position.

13. The computer enclosure as described in claim 10, wherein the chassis defines a sliding gap therein, and an operating portion extends from the operating member for inserting through the sliding gap to operate the operating member.

14. The computer enclosure as described in claim 10, wherein a plurality of projecting blocks is disposed on the operating member, for urging the hooks to disengage from edges of the locking openings.

15. The computer enclosure as described in claim 14, wherein a plurality of stop blocks is formed on the catch flange of the chassis, and a plurality of protrusions is formed on the top cover for engaging with the stop blocks to lift the top cover from the chassis.

16. The computer enclosure as described in claim 15, wherein the operating member comprises a pair of support plates, and the projecting block and the securing openings are respectively disposed on the different support plates.

17. The computer enclosure as described in claim 16, wherein one of the support plates of the operating member defines a plurality of through openings therein adjacent to the securing openings respectively, for the protrusions inserted therethrough to engage with the stop blocks of the chassis.

18. An electronic device comprising:
    a chassis of said electronic device defining a space therein for receiving components of said electronic device;
    a cover enclosing said space of said chassis cooperatively with said chassis, said cover capable of movably resting on said chassis in a first position thereof relative to said chassis along a first direction, and movable from said first position thereof to a second position thereof relative to said chassis along a second direction different from said first direction so as to engage with said chassis and prevent said cover from moving along said first direction; and
    an operating member movably attachable to one of said chassis and said cover, said operating member resiliently movable along said second direction and capable of urging movement of said cover between said first and second positions of said cover by means of movement of said operating member along said second direction.

19. The electronic device as described in claim 18, wherein a plurality of projecting blocks is formed in said operating member for engagably urging said movement of said cover between said first and second positions thereof.

20. The electronic device as described in claim 18, wherein a plurality of blocks is formed in said chassis, and a plurality of corresponding protrusions is formed in said cover, engagement between each of said plurality of blocks and each of said plurality of protrusions is capable of repelling said cover away from said chassis.

* * * * *